April 28, 1970 R. G. SANDERS 3,509,026
METHOD OF AND APPARATUS FOR INDICATING THE SENSITIVITY
OF MICROORGANISMS TO ANTIBIOTICS
Filed Jan. 19, 1967
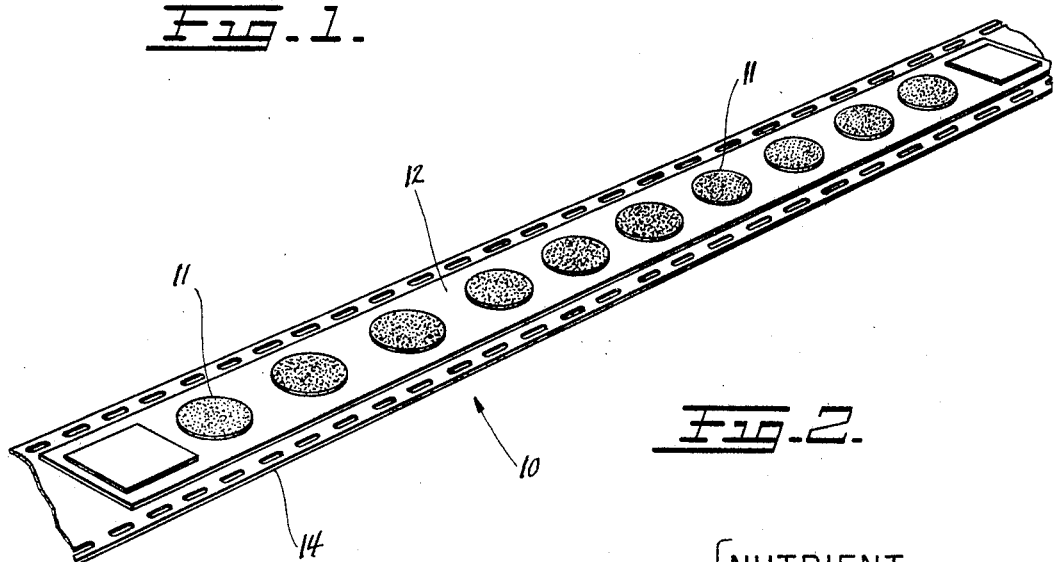
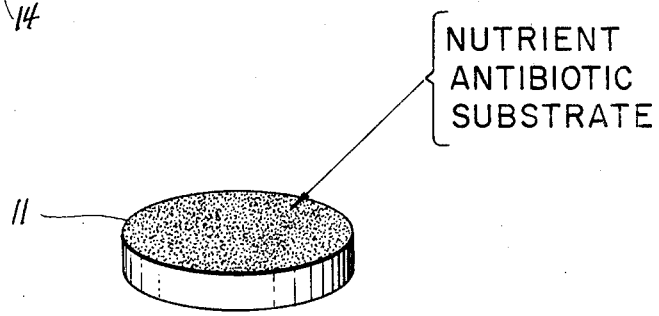
INVENTOR.
ROBERT G. SANDERS

United States Patent Office 3,509,026
Patented Apr. 28, 1970

3,509,026
METHOD OF AND APPARATUS FOR INDICATING THE SENSITIVITY OF MICROORGANISMS TO ANTIBIOTICS
Robert G. Sanders, Mound, Minn., assignor to Litton Systems, Inc., Beverly Hills, Calif., a corporation of Maryland
Filed Jan. 19, 1967, Ser. No. 610,410
Int. Cl. G01n 31/00; C12k 1/04
U.S. Cl. 195—103.5                                6 Claims

ABSTRACT OF THE DISCLOSURE

A mounting strip is provided with a series of pads formed from inert material and is secured to a carrier which is suitable for advancing the mounting strip and the pads for processing. Each pad is provided with a nutrient medium, an antibiotic agent and a substrate. The pad is innoculated with bacteria and then incubated. The substrate normally has an undetectable characteristic and is acted upon by a vital enzyme system formed by the growth of the bacteria to produce a detectable end product which is indicative of the bacterial growth. If the bacteria is sensitive to the antibiotic agent, the end product production is limited, indicating such antibiotic sensitvity. One substrate which is reactive with the vital enzyme system alkaline phosphatase is flavone 3-diphosphate. The enzyme system hydrolyzes the flavone 3-diphosphate to produce the fluorescent end product 3-hydroxy flavone which is detectable to provide an indication of the antibiotic sensitivity of the bacteria producing the alkaline phosphatase.

---

This invention relates to methods of and apparatus for indicating the sensitivity of microorganisms to antibiotics and, more particularly, to methods of and apparatus for determining antibiotic sensitivity, i.e., the sensitivity of bacteria to antibiotics.

In the past, various methods have been used to determine antibiotic sensitivity. Thus, the art recognizes such methods as agar diffusion, blood-agar, fermentation, redox indicator and serial dilution. In general, each of these methods requires a relatively long time (8 hours to 2 days) to produce interpretable results from a relatively pure bacterial culture. In addition, even improvements of these methods, such as improved redox indicators which are responsive to changes in the redox potential which result from metabolic processes of living microorganisms, are not responsive to all microorganisms because some forms of bacterial growth do not significantly change the redox potential. Thus, even such improved method is not useful as a universal detector of the growth if microorganisms. Furthermore, such improved method requires a substantial amount of bacterial growth before the redox potential changes. Accordingly, a relatively long period of time is required to achieve results, especially when only a small number of organisms, such as a few hundred, are available. Finally, such method is not quantitative because the degree and area of color change of the redox indicator are not proportional to the degree of effectiveness of the antibiotic.

While the electronic and mechanical arts have developed sufficiently to automatically perform complex data and component handling operations, the application of such arts to the automatic determination of antibiotic sensitivity has awaited development of a simple, quantitative and universal apparatus and method for rapidly and reliably indicating the effect of antibiotics upon bacterial growth. Provision of such automated facilities will relieve the physician's staff from time consuming laboratory analysis and will provide a rapid indication of suitable chemotherapy for administration to patients having infectious diseases.

Research has been conducted in an endeavor to develop a rapid and reliable method and apparatus for detecting antibiotic sensitivity which is both simple enough to adapt to automated procedures and responsive to substantially all bacteria. Such research indicates that because certain vital enzymes are common to all living bacteria, the detection of such enzymes by the use of selected substrates provides a relatively rapid and universal way to detect bacterial growth and antibiotic sensitivity. In particular, the esterases, such as the phosphatases, and the dehydrogenases, and the oxidases are vital enzymes which are common to all living bacteria.

A rapid and reliable antibiotic sensitivity detector may be prepared by selecting a substrate which reacts with a vital enzyme. The substrate, such as flavone 3-diphosphate (for response to the enzyme alkaline phosphatase), is impregnated into an inert support material along with a nutrient medium and a selected antibiotic. The substrate normally has an undetectable characterstic, that is, for example, the flavone 3-diphosphate is not fluorescent. Because the substrate is sensitive to microgram amounts of vital enzymes produced by small numbers of living bacteria, the fluoroescence of an end product, such as 3-hydroxy flavone, for example, resulting from the reaction between the alkaline phosphatase and the substrate flavone 3-diphosphate, provides a relatively rapid and sensitive indication of the degree of antibiotic sensitivity of bacteria added to the impregnated inert support material.

An object of the present invention is to provide a new and improved method and apparatus for determining antibiotic sensitivity.

Another object of the present invention is to provide a rapid and universal method of determining the sensitivity of substantially all bacteria to a variety of antibiotics.

Still another object of the present invention resides in the provision on an inert support material of a nutrient medium, an antibiotic agent, and a universal substrate for detecting the sensitivity of bacteria placed on the support material to the antibiotic.

These and other objects of the present invention will become apparent by reference to the following specification describing a preferred embodiment thereof and to the drawings, in which:

FIG. 1 is a perspective view of a carrier which supports a mounting strip provided with a plurality of inert pads impregnated according to the principles of the present invention; and FIG. 2 is a detailed view of a single inert pad shown impregnated with an antibiotic, a nutrient and a substrate.

Referring now to FIG. 1 of the drawings, an apparatus or detector 10 for indicating the sensitivity of microorganisms to antibiotics in accordance with the present invention may include an inert supporting material for receiving a nutrient medium, an antibiotic agent and a selected substrate. The supporting material may be prepared in the form of discrete segments such as discs or pads 11, for example, which are fabricated from cellulose acetate, filter paper, such as Schliecher and Schnell No. 470–W, or polyurethane foam. While the acetate and filter paper are suitable, the polyurethane foam is preferred because it can be vacuum dried to less than 1.0% moisture or dried in vacuum in the frozen state and it will withstand autoclaving and temperatures of —30° C. without substantial loss of desirable properties.

To permit rapid processing of many bacterial samples, the discs 11 may be supported in seriatim on a mounting strip 12 which is secured to a carrier tape 14 for automatic transport through the steps of the antibiotic sensitivity indication process of the present invention. The tape 14 may be provided with an information bearing marker (not shown) adjacent to each disc 11 for indicating the type or amount, for example, of the nutrient medium, antibiotic agent, and substrate provided on the disc 11.

As used herein, a vital enzyme or a vital enzyme system is an enzyme which is vital to and is present in all living bacteria. In accordance with the present invention, the following three groups of enzymes are considered to be vital enzymes which are produced by all living bacteria: dehydrogenases, oxidases, phosphatases.

The present invention contemplates the provision of a universal antibiotic sensitivity indicator including a substrate selected for reaction with at least one of such vital enzymes. In a specific embodiment, a substrate of the present invention which reacts with one of the phosphatases is flavone 3-diphosphate. This compound has a low level characteristic fluorescence and thus is said to have an undetectable normal characteristic. Flavone 3-diphosphate is hydrolized by alkaline phosphatase which is produced by all living bacteria. The hydrolysis produces sodium phosphate and the highly fluorescent and easily detectable compound 3-hydroxy flavone which is clearly distinguished from the relatively undetectable normal fluorescence of the flavone 3-diphosphate.

Another substrate which may be used to detect alkaline phosphatase is beta naphthyl acid phosphate, a compound also having a low level characteristic fluorescence, which may be termed an undetectable normal characteristic. The enzyme alkaline phosphatase from bacteria hydrolyzes the beta naphthyl acid phosphate to produce beta naphthol and a phosphate salt. Beta naphthol is a highly fluorescent compound with a characteristic fluorescent wavelength that can easily be distinguished from that of the beta naphthyl acid phosphate. A stock solution of the beta naphthyl acid phosphate may be used containing about 2 mg./ml. beta naphthyl acid phosphate in a 0.0005 M tris buffer (pH 7.6).

The phosphatase enzymes may also be detected by phenolphthalein phosphate and by paranitrophenol phosphate. In the case of phenolphthalein phospate, the end product phenolphthalein is detected colorimetrically, whereas the end product paranitrophenol from the latter reaction is detected spectrophotometrically.

Considering now the vital dehydrogenase enzymes, lactic dehydrogenase, for example, is produced by growing bacteria and reacts with a substrate of the present invention. In particular, the substrate lactic acid reacts with lactic dehydrogenase in the presence of the cofactor pyridine nucleotide to produce pyruvic acid, which is detected to determine the amount of batcerial growth. The amount of dehydrogenation of lactic acid (see Equation 1 below) may, in the alternative, be determined by following the change in DPN spectrophotometrically, as follows:

$$CH_3 \cdot CHOH \cdot COOH + DPN^+ + \text{lactic dehydrogenase} \rightleftarrows CH_3 \cdot CO \cdot COOH + DPNH + H^+ \quad (1)$$

In addition, the cofactor cytochrome $b_2$ may be used as a hydrogen acceptor in the dehydrogenation of lactic acid as follows:

$$CH_3 \cdot CHOH \cdot COOH + 2b_2^{3+} + \text{lactic dehydrogenase} \rightarrow CH_3 \cdot CO \cdot COOH + 2b_2^{2+} + 2H^+$$

The rate of reduction of methylene blue is an indicator of the bacterial growth which produces the lactic dehydrogenase.

Directing attention to the vital oxidase enzymes, the substrate sodium ascorbate may be used to detect the presence of the enzyme cytochrome oxidase, for example, which is produced by growing bacteria. The reaction is as follows:

$$\text{Sodium ascorbate} + \text{cytochrome c} + \text{cytochrome oxidase} \rightarrow O_2^+ \text{ reduced cytochrome oxidases} \quad (2)$$

be sensed manometrically, for example, to indicate the sensitivity of the bacteria to the antibiotic agent.

The end product, oxygen, produced by the reaction may

The antibiotic agents which may be applied to the inert discs 11 may be penicillin, chortetracycline, erthromycin, oleadomycin, oxytetracycline, polymixin, tetracycline, chloramphenicol, ristocetin, vanomycin, neomycin, novobiocin, streptomycin, sufathiozole, colistin, sulfanilamide, or other chemical substances which will inhibit the growth of or kill microorganisms. To relate antibiotic dosage to the antibiotics used on the discs 11, it is preferable to use various concentrations of the antibiotics on the discs 11. For example, penicillin may be provided on two discs 11 in concentrations of 1 and 10 units per ml.

Because bacteria have a wide diversity of nutritional requirements, the nutrient medium applied to the disc 11 of the universal antibiotic detector 10 should provide a similar range of nutritional material, while being compatible with the detection of enzymatic growth. In general, two nutrient solutions are required: one to culture anaerobic organisms, the other to meet the requirements necessary for aerobes and microaerophiles. The anaerobic nutrient medium contains a series of nutrients, such as beef broth, coupled with compounds such as thioglycollate or a cystine-cystiene buffer system to keep the oxidation-reduction potential (Eh) less than —0.2 volt.

Nutrient media for aerobes and microaerophiles contains an enrichment base such as brain heart infusion. Trace amounts of defined accessory growth substances, such as vitamins, may also be provided. Combination of enrichment nutrients and specific accessory factors required by fastidious pathogens yields a nutrient medium favorable for cultivation of substantially all bacteria of interest. The pH of the medium should be maintained at about 7.2 which is within the growth range of substantially all bacteria which may be of interest.

While the selection of antibiotic agents may be governed by local factors, such as the outbreak of an epidemic in a particular location, a suitable antibiotic sensitivity indication may be obtained when a series of discs 11 are provided with the following antibiotic agents:

CHART I

| Disc 11 | Antibiotic agent |
|---|---|
| (1) | Penicillin (1 unit per ml.). |
| (2) | Penicillin (10 units per ml.). |
| (3) | One of the following antibiotics: chlortetracycline, erthromycin, oleandomycin, oxytetracycline, polymixin and tetracycline, (2 micrograms per ml.) to which gram positive bacteria are sensitive. |
| (4) | Segment 3 antibiotic in 5 microgram per ml. concentration. |
| (5) | One of the following antibiotics: chloramphenicol, ristocetin, and vancomycin (100 micrograms/ml.) to which gram sensitive bacteria are sensitive. |
| (6) | Segment 5 antibiotics at 300 micrograms/ml. concentration. |
| (7) | One of the following antibiotics: Neomycin, novobiocin and streptomycin at 200 micrograms/ml. concentration, to which gram negative bacteria are sensitive. |
| (8) | Segment 7 antibiotics at 400 micrograms/ml. concentration. |
| (9) | Sulfathiozole at a concentration of 200 micrograms/ml. |

Nine discs 11 of the series of discs shown in FIG. 1 are impregnated with a common one of the foregoing nutrient media and substrates, along with antibiotic agents, such as set forth in Chart I. To determine the antibiotic sensitivity of bacteria, the nine discs are innoculated with the bacteria, with the tenth disc 11 shown in FIG. 1 being used as a control which is not innoculated with bacteria. The mounting strip 12 is then placed in a suitable incubation chamber for a period of up to 8 hours, whereafter each disc 11 is examined to detect the presence of the anticipated end product, such as the fluorescent end product 3-hydroxy flavone, for example. The amount of end product production on each disc 11 provides a quantitative indication of the sensitivity of the bacteria to the various antibiotic agents on the discs 11.

Selected ones of the foregoing described inert discs 11, nutrient media, substrates and antibiotic agents were evaluated initially to provide a qualitative indication of antibiotic sensitivity as shown in the following examples. In these examples, bacterial growth produces the vital enzyme system alkaline phosphatase. The presence of alkaline phosphatase is indicated by the detection of the fluorescent end product 3-hydroxy flavone which is produced as a result of hydrolysis of the substrate flavone 3-diphosphate by the alkaline phosphatase. In the event the bacteria is sensitive to the antibiotic, bacterial growth is inhibited or precluded, thus a lesser amount or no fluorescent end product is produced.

CHART II

|  | Example I | Example II |
|---|---|---|
| Substrate (S) | Flavone 3-diphosphate | Flavone 3-diphosphate. |
| Organism | M. aureus | E. coli. |
| Antibiotic | Penicillin G (benzylpenicillin) (P) | Streptomycin sulfate (S). |
| Nutrient (N) | Trypticase soy broth | Trypticase soy broth. |
| Inert support | Sterile millipore filter pads in Rodac plates. | Sterile millipore filter pads in Rodac plates. |

A stock solution of the flavone 3-diphosphate was used containing 2 mg./ml. flavone 3-diphosphate in a 0.0005 M tris buffer (pH 7.6). The organisms were laboratory strains, which for M. aureus were sensitive to 2 units penicillin/ml. and resistant to 2 mg. streptomycin/ml. and which for E. coli were sensitive to 2 mg. streptomycin/ml. and resistant to 10 units penicillin/ml. The antibiotic agents were obtained from the Eli Lilly Company.

The organisms were scraped from 24-hour trypticase soy agar plates and suspended in 0.85% saline solution. They were then centrifuged and resuspended in broth to remove as much residual alkaline phosphatase activity as possible. The optical density of the suspensions was measured at 620 m$\mu$ in the Spectronic colorimeter and was 0.40 for M. aureus and 0.35 for E. coli, representing $10^7$–$10^8$ cells/ml.

As a control, a disc 11 for each one of the following solutions was prepared. Each disc 11 was provided with one of the solutions and was incubated at 37° C. for 8 hours.

CHART III (a) Nutrient
(b) Substrate and alkaline phosphatase
(c) Substrate and nutrient and penicillin (10 units/ml.)
(d) Substrate and nutrient and streptomycin (10 $\mu$g./ml.)
(e) Nutrient and M. aureus
(f) Nutrient and E. coli Fluorescence was observed only on disc (b), indicating that the desired experimental conditions were present.

Additional discs 11 were then impregnated with 1.0 ml. of the following solutions and, as indicated, were provided with organisms at time zero.

CHART IV

| Disc No. | Disc Impregnators | Experimental condition: R=Refrigerated I=incubated at 37° C. | Fluorescence of disc read at X hours | | |
|---|---|---|---|---|---|
| | | | 0 hrs. | 4 hrs. | 8 hrs |
| 1a | }N+S (1 mg./ml.)+P 2U/ | R | − | − | − |
| 1b | } ml.+M. aureus. | I | − | + | + |
| 2a | }N+S (1 mg./ml.)+P | R | − | − | − |
| 2b | } 10U/ml.+M. aureus. | I | − | ± | ± |
| 3a | }N+S (1 mg./ml.)+P | R | + | ± | ± |
| 3b | } 2U/ml.+E. coli. | I | + | 4+ | 4+ |
| 4a | }N+S (1 mg./ml.)+10U/ | R | ± | ± | ± |
| 4b | } ml.+E. coli. | I | ± | 3+ | 4+ |
| 5a | }N+S (1 mg./ml.)+S | R | − | − | − |
| 5b | } 2 µg./ml.+M. aureus. | I | − | ± | 2+ |
| 6a | }N+S (1 mg./ml.)+S 10 | R | − | − | − |
| 6b | } 10 µg./ml.+M. aureus. | I | − | − | + |
| 7a | }N+S (1 mg./ml.)+S | R | ± | ± | ± |
| 7b | } 2 µg./ml.+E. coli. | I | ± | 3+ | 3+ |
| 8a | }N+S (1 mg./ml.)+10 µg./ | R | ± | ± | ± |
| 8b | } ml.+E. coli. | I | ± | + | + |

Those discs (1a, 2a, etc.) designated for zero time reading were immediately refrigerated and the remainder of the pads (1b, 2b, etc.) were incubated at 37° C. for the time period indicated on Chart IV.

After incubation (0, 4 and 8 hours), the discs 1b–8b were visually evaluated and rated for a qualitative amount of fluorescence under ultraviolet light using a 4+ score for the substrate-alkaline phosphatase control (b) in Chart III as a basis for comparison. Discs 1a, 2a and 3a showed no fluorescence when observed, indicating the desired experimental condition. Chart IV indicates, for example, that M. aureus is sensitive to penicillin at concentrations of 2 and 10 units/ml. (discs 1b and 2b). Also, E. coli is shown as being resistant to penicillin in both 2 unit/ml. and 10 unit/ml. concentrations (discs 3b and 4b), for example.

Reference is now made to Charts V and VI which set forth the details of an experiment conducted to provide quantitative data indicative of the antibiotic sensitvity of E. coli to streptomycin sulphate and penicillin G. In the experiment five different experimental combinations were used, with each combination being impregnated into four discs 11, as follows:

CHART V

| Test No. | Experimental combination |
|---|---|
| 1 | Substrate+nutrient medium. |
| 2 | Substrate+nutrient medium+E. coli. |
| 3 | Substrate+nutrient medium+E. coli+streptomycin sulphate. |
| 4 | Substrate+nutrient medium+E. coli+penicillin G. |
| 5 | E. coli+nutrient medium (control). |

In the experiment, a first disc 11 from each test number was read at zero incubation time, a second disc 11 from each test number was read after 2 hours incubation time, a third disc 11 from each test number was read after 4 hours incubation time, and a fourth disc 11 from each test number was read after six hours incubation time.

The substrate used was a solution of flavone 3-diphosphate including 0.5 mg./ml. flavone 3-diphosphate in tris buffer (pH 8.0). The antibiotic agents used were normal clinical types Eli Lilly Co.) of streptomycin sulphate and penicillin G at 10 $\mu$g./ml. concentrations. The nutrient medium was tripticase soy broth.

The substrate, nutrient medium and antibiotic agents were impregnated into discs 11 formed from Millipore absorbent backing paper in ratios of 45% substrate, 45% nutrient medium and 10% antibiotic agent to provide a total impregnation of 0.4 ml. into each disc 11. The organisms were E. coli taken from an 18 hour culture in tripticase soy broth. The organisms in 0.025 ml. aliquots were used to inoculate the discs 11.

After incubation at 37° C. for the time periods indicated on Chart VI, the fluorescene of the discs 11 was read using a Beckman "DK$_2$" spectrophotometer with a fluorescence attachment. The readings were taken with the spectrophotometer set at a time constant of 0.6, a range of 0–200, a sensitivity of 0.48, a slit of 0.7, on scale N, with a scan time setting of 50 and the percent transmission was read at 520 millimicrons (stationar).

CHART VI

| Test No. | Percent transmission (amount of fluorescence) read after X hours of incubation | | | |
|---|---|---|---|---|
| | 0 hrs. | 2 hrs. | 4 hrs. | 6 hrs. |
| 1 | 9 | 8 | 11 | 10 |
| 2 | 9 | 8 | 14 | 25 |
| 3 | 9 | 9 | 9 | 12 |
| 4 | 9 | 9 | 19 | 24 |
| 5 | 8 | 8 | 8 | 7 |

Chart VI shows that as early as after four hours of incubation, the growth of E. coli is indicated (test number 2) and that the sensitivity of E. coli to the streptomycin sulphate is apparent. Further, Chart VI shows that after four hours incubation, the E. coli is resistant to penicillin G.

These results are confirmed by the 6-hour readings shown on Chart VI in that test numbers 2 and 4 are of almost equally high fluorescence, whereas the percent transmission of test numbers 3 remain at a relatively low level (12%) as compared to the 24% and 25% readings for test numbers 2 and 4.

The data from Chart VI may be used to provide a physician's staff, for example with a rapid indication of

What is claimed is:

1. A sustantially universal test element for indicating the sensitivity of bacteria to antibiotics, comprising an inert support, and a composition carried by said support including a substantially universal nutrient material for supporting the growth of one of the two classes of bacteria identified as aerobic or anaerobic, an antibiotic agent, and flavone 3-diphosphate to provide a detectable change indicative of the extent of bacterial growth in said composition.

2. A test element as set forth in claim 1, having a plurality of said inert supports each carrying said composition, wherein the antibiotic agent is different for different ones of said supports.

3. A test element as set forth in claim 1, having a plurality of said inert supports each carrying said composition, wherein the concentration of antibiotic agent is different for differnt ones of said supports.

4. A process of testing for the sensitivity of bacteria to an antibiotic, comprising applying a bacteria containing fluid to a test element containing a bacterial growth supporting nutrient, an antibiotic, and flavone 3-diphosphate, said nutrient being substantially universal for suporting the growth of one of the two classes of bacteria identified as aerobic and anaerobic, incubating the applied bacteria, and detecting the change in said flavone 3-diphosphate as a measure of the extent of growth of said bacteria.

5. A process as set forth in claim 4, wherin said bacterial fluid is applied to a plurality of said test elements, and wherein different ones of said test elements contain different antibiotics.

6. A process as set forth in claim 4, wherein said bactrial fluid is applied to a plurality of said test elements, and wherein different ones of said test elements contains different concentrations of said antibiotic.

References Cited

UNITED STATES PATENTS

| | | | |
|---|---|---|---|
| 2,359,052 | 9/1944 | Scharer | 195—103.5 |
| 2,904,474 | 9/1959 | Forg | 195—103.5 |
| 2,967,132 | 1/1961 | Sacks | 195—103.5 |
| 2,999,793 | 9/1961 | Babson | 195—103.5 |
| 3,086,917 | 4/1963 | Kinoshita et al. | |
| 3,107,204 | 10/1963 | Brown et al. | 195—103.5 |
| 3,331,752 | 7/1967 | Struck et al. | 195—103.5 |
| 3,331,857 | 7/1967 | Coleman | 195—103.5 |
| 2,764,596 | 9/1956 | Avakian et al. | 260—345.2 |
| 3,384,555 | 5/1968 | Guilbault et al. | 195—103.5 |

OTHER REFERENCES

Prescott et al., Industrial Microbiology, 3rd edition, p. 305 (1959).

Sumner et al., Chemistry and Methods of Enzymes, 3rd edition, pp. 90–91 (1953).

Moss, Biochem. Journal, vol. 76, p. 32 (1960).

Quittner et al., Antimicrobial Agents and Chemotherapy, pp. 451–455 (1963).

Sumner et al., The Enzymes, Chemistry and Mechanism of Action, vol. II, part I, pp. 274, 275, 284, 286–288, 364–368 and 382–388 (1951).

ALVIN E. TANENHOLTZ, Primary Examiner

U.S. Cl. X.R.

195—127

FO-1050
(5/69)

UNITED STATES PATENT OFFICE
CERTIFICATE OF CORRECTION

Patent No. 3,509,026          Dated April 28, 1970

Inventor(s) SANDERS, ROBERT G.

It is certified that error appears in the above-identified patent and that said Letters Patent are hereby corrected as shown below:

In the specification, Column 1, Line 53, after the word growth, delete "if" and insert therefor --of--.

In the specification, Column 3, Line 73, delete "be sensed manometrically, for example, to indicate the" and insert therefor --The end product, oxygen, produced by the reaction may--.

In the specification, Column 3, Line 74, delete "sensitivity of the bacteria to the antibiotic agent." and insert therefor --be sensed manometrically, for example, to indicate the--.

In the specification, Column 3, Line 75, delete "The end product, oxygen, produced by the reaction may" and insert therefor --sensitivity of the bacteria to the antibiotic agent--.

In the specification, Column 6, Line 51, after the word millimicrons, delete "(stationar)" and insert therefor --(stationary)--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents